(12) United States Patent
Ito et al.

(10) Patent No.: US 10,311,867 B2
(45) Date of Patent: Jun. 4, 2019

(54) TAGGING SUPPORT APPARATUS AND METHOD

(71) Applicant: KABUSHIKI KAISHA TOSHIBA, Minato-ku, Tokyo (JP)

(72) Inventors: Masahiro Ito, Kanagawa (JP); Kenji Iwata, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 187 days.

(21) Appl. No.: 15/421,411

(22) Filed: Jan. 31, 2017

(65) Prior Publication Data

US 2017/0140758 A1 May 18, 2017

Related U.S. Application Data

(63) Continuation of application No. PCT/JP2015/058544, filed on Mar. 20, 2015.

(51) Int. Cl.
*G06F 17/27* (2006.01)
*G10L 15/18* (2013.01)
(Continued)

(52) U.S. Cl.
CPC ........ *G10L 15/22* (2013.01); *G06F 16/90332* (2019.01); *G06F 17/2785* (2013.01);
(Continued)

(58) Field of Classification Search
CPC .......... G06F 17/2785; G06F 17/30976; G10L 15/1822; G10L 15/1815; G10L 15/22
See application file for complete search history.

(56) References Cited

U.S. PATENT DOCUMENTS 8,688,453 B1\* 4/2014 Joshi .................. G10L 15/00
704/10
2003/0158723 A1\* 8/2003 Masuichi ............ G06F 17/2785
704/4
(Continued)

FOREIGN PATENT DOCUMENTS

JP 2000200273 A 7/2000
JP 2002537591 A 11/2002
(Continued)

OTHER PUBLICATIONS

International Search Report (ISR) and Written Opinion dated May 19, 2015 issued in International Application No. PCT/JP2015/058544.
(Continued)

*Primary Examiner* — Samuel G Neway
(74) *Attorney, Agent, or Firm* — Holtz, Holtz & Volek PC

(57) ABSTRACT

According to an embodiment, a tagging support apparatus includes a first acquirer, an estimator, a first storage, a second acquirer, and a presenter. The first acquirer acquires a spoken sentence concerning an utterance of a user. The estimator estimates an utterance intention of the spoken sentence to obtain one or more intention candidates of the utterance intention. The first storage stores an intention system having a hierarchical structure of intentions used in a dialog system. The second acquirer acquires, based on the intention candidates, part of the intention system as one or more hierarchical intention candidates. The presenter presents the hierarchical intention candidates.

12 Claims, 6 Drawing Sheets

(51) Int. Cl.
*G10L 15/22* (2006.01)
*G06F 16/9032* (2019.01)

(52) U.S. Cl.
CPC ...... *G10L 15/1815* (2013.01); *G10L 15/1822* (2013.01); *G10L 2015/221* (2013.01); *G10L 2015/223* (2013.01)

(56) References Cited

U.S. PATENT DOCUMENTS

| | | | |
|---|---|---|---|
| 2007/0055529 A1* | 3/2007 | Kanevsky | G10L 15/1822 704/275 |
| 2009/0077047 A1* | 3/2009 | Cooper | G06F 17/2785 |
| 2012/0265819 A1* | 10/2012 | McGann | G06Q 10/00 709/204 |
| 2012/0331064 A1* | 12/2012 | Deeter | G06Q 50/01 709/206 |
| 2013/0325992 A1* | 12/2013 | McGann | H04L 51/046 709/206 |
| 2014/0379326 A1 | 12/2014 | Sarikaya et al. | |
| 2015/0227845 A1* | 8/2015 | Hakkani-Tur | G06F 17/2785 706/52 |
| 2015/0347375 A1* | 12/2015 | Tremblay | G06F 17/271 704/9 |
| 2017/0140758 A1* | 5/2017 | Ito | G10L 15/1815 |

FOREIGN PATENT DOCUMENTS

| | | |
|---|---|---|
| JP | 2003242136 A | 8/2003 |
| JP | 2007193697 A | 8/2007 |
| JP | 2009146158 A | 7/2009 |
| JP | 2012042998 A | 3/2012 |
| WO | 0045307 A1 | 8/2000 |

OTHER PUBLICATIONS

Yuki Irie, et al., "Speech Intention Understanding based on Spoken Dialogue Corpus", Dai 38 Kai Reports of the Meeting of Special Internet Group on Spoken Language Understanding and Dialogue Processing (SIG-SLUD-A301), Jul. 4, 2003, pp. 7-12.

* cited by examiner

| Power (power operation) | | ~201 |
|---|---|---|
| ⊢ | On (turn on) | ⎫ |
| ⌞ | Off (turn off) | ⎬ 202 |
| Mute (mute operation) | | |
| ⊢ | On (mute) | |
| ⌞ | Off (cancel) | |
| Volume (volume operation) | | |
| ⊢ | Up (turn up) | |
| ⊢ | Down (turn down) | |
| ⌞ | Specific (specific value) | |
| | . | |
| | . | |
| | . | |

FIG. 2

| | | |
|---|---|---|
| Mute (mute operation) | | |
| ⊢ | On (mute) | 501 |
| ⌊ | Off (cancel) | |
| Volume (volume operation) | | |
| ⊢ | Up (turn up) | |
| ⊢ | Down (turn down) | |
| ⌊ | Specific (specific value) | |
| Audio (acoustic operation) | | |
| ⊢ | Change (change mode) | |
| ⌊ | Default (reset) | |

F I G. 5

600

| Spoken sentence 601 | Intention tag 602 |
|---|---|
| Reduce sound | Volume-down |
| Stop watching | Playing-off |

F I G. 6

TAGGING SUPPORT APPARATUS AND METHOD

CROSS-REFERENCE TO RELATED APPLICATIONS

This application is a Continuation Application of PCT Application No. PCT/JP2015/058544, filed Mar. 20, 2015, the entire contents of which are incorporated herein by reference.

FIELD

Embodiments described herein relate generally to a tagging support apparatus and method.

BACKGROUND

In a dialogue system, there is processing of assigning an intention tag representing the utterance intention of a user to a spoken sentence representing the contents of an utterance of the user. This processing generally uses a method in which a worker sees the spoken sentence and selects an intention tag considered to represent a correct intention from an intention tag candidate group. At this time, there exist, for example, a method of presenting all candidates and causing the worker to select an intention tag and a method of presenting intention tags after narrowing down them to a smaller number of more probable candidates and causing the worker to select an intention tag.

In the method of presenting all intention tag candidates, however, if the number of candidates is as large as several tens or several hundreds, it is difficult to understand the meanings of all the candidates and assign an intention tag. Additionally, if the number of candidates is large, but the work needs to be done in a short time, the accuracy of intention tag assignment processing lowers because it is hard to sufficiently understand the meanings of the candidates.

In the method of narrowing down candidates to a group of a smaller number of candidates, a correct candidate may be absent in the narrowed candidate group. In this case, a correct intention tag cannot be assigned.

BRIEF DESCRIPTION OF THE DRAWINGS

FIG. 2 is a view showing an example of an intention system stored in an intention system DB.

FIG. 5 is a view showing an example of hierarchical intention candidates acquired by an intention system acquirer from the intention candidates shown in FIG. 4.

FIG. 6 is a view showing an example of data stored in a work result DB 107.

DETAILED DESCRIPTION

Figure 1:
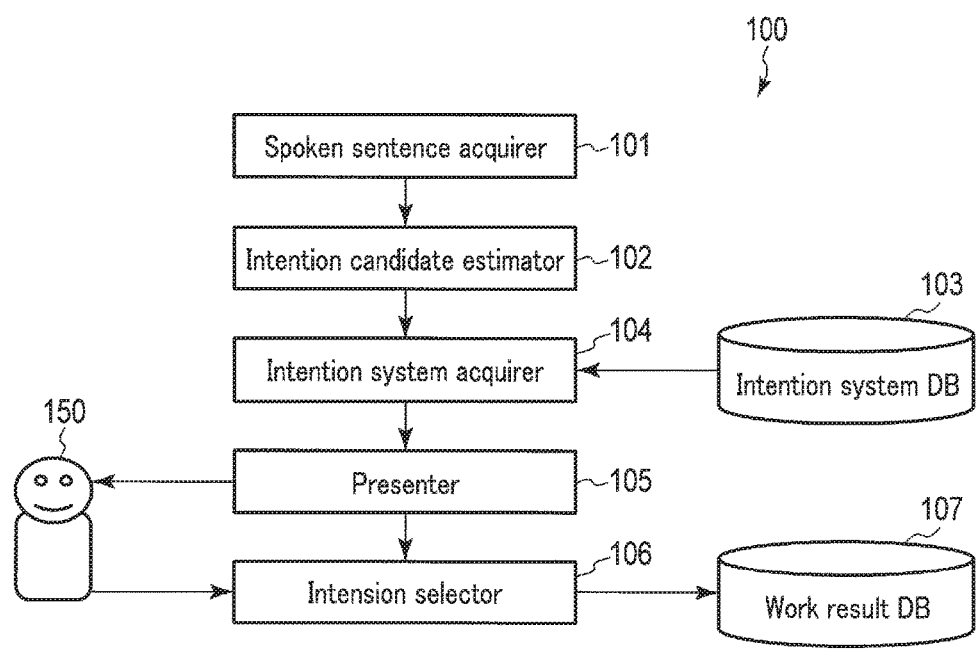
FIG. 1 is a block diagram showing a tagging support apparatus according to the first embodiment.

A tagging support apparatus and method, and a terminal according to the embodiments will now be described in detail with reference to the accompanying drawings.

According to an embodiment, a tagging support apparatus includes a first acquirer, an estimator, a first storage, a second acquirer, and a presenter. The first acquirer acquires a spoken sentence concerning an utterance of a user. The estimator estimates an utterance intention of the spoken sentence to obtain one or more intention candidates of the utterance intention. The first storage stores an intention system having a hierarchical structure of intentions used in a dialogue system. The second acquirer acquires, based on the intention candidates, part of the intention system as one or more hierarchical intention candidates. The presenter presents the hierarchical intention candidates.

Note that in the following embodiments, parts denoted by the same reference numerals are assumed to perform the same operations, and a repetitive description will appropriately be omitted.

First Embodiment

A tagging support apparatus according to the first embodiment will be described with reference to the block diagram of FIG. 1.

A tagging support apparatus 100 according to the first embodiment includes a spoken sentence acquirer 101 (also called a first acquirer), an intention candidate estimator 102, an intention system database (DB) 103 (also called a first storage), an intention system acquirer 104 (also called a second acquirer), a presenter 105, an intention selector 106, and a work result database (DB) 107 (also called a second storage).

The spoken sentence acquirer 101 acquires a spoken sentence concerning an utterance of a user made for a dialogue system. Here, the dialogue history or log data of the dialogue system is acquired from outside. The spoken sentence may be input via a keyboard, or a result of speech recognition of an utterance may be acquired as the spoken sentence.

The intention candidate estimator 102 receives the spoken sentence from the spoken sentence acquirer 101, estimates, from the spoken sentence, an utterance intention that may be represented by the spoken sentence, and obtains one or more intention candidates as the candidates of the utterance intention.

The intention system DB 103 stores an intention system that expresses intentions used in the dialogue system as a hierarchical structure. The intention system will be described later with reference to FIG. 2.

The intention system acquirer 104 receives the spoken sentence and the one or more intention candidates from the intention candidate estimator 102, and based on the one or more intention candidates, acquires part of the intention system from the intention system DB 103 as one or more hierarchical intention candidates.

The presenter 105 receives the spoken sentence and the one or more hierarchical intention candidates from the intention system acquirer 104, and presents the spoken sentence and the one or more hierarchical intention candidates to a worker 150. The worker 150 is a worker who performs intention tag assignment processing, and is assumed to be a person different from the user who has made the utterance concerning the spoken sentence. However, the user who has made the utterance concerning the spoken sentence may do the work.

The intention selector 106 receives the spoken sentence and the one or more hierarchical intention candidates from the presenter 105 and an instruction from the worker 150, and selects a hierarchical intention candidate according to the instruction from the worker 150 as a selected intention of the spoken sentence.

The work result DB 107 receives the spoken sentence and the selected intention from the intention selector 106, and stores the spoken sentence and the selected intention in association with each other.

An example of the intention system stored in the intention system DB 103 will be described next with reference to FIG. 2.

As shown in FIG. 2, the intention system is designed as a hierarchical structure having a superordinate concept 201 and a subordinate concept 202. More specifically, there is "power operation" as an intention of the superordinate concept 201, and "turn on" and "turn off" are associated as intentions of the subordinate concept 202 of "power operation". That is, the concept "power operation" represents an intention of "performing some operation for the power" without specifying an operation of "turning on the power" or an operation of "turning off the power". The intention system stored in the intention system DB 103 is created in advance by referring external data or the like.

FIG. 2 shows, as a detailed example, an intention system in a case in which a dialogue system concerning a TV operation is assumed. In the dialogue system concerning a TV operation, the following intentions are assumed to be designed as intentions concerning a TV operation.
"Power (power operation)"
"Power-on (turn on power)"
"Power-off (turn off power)"
"Mute (mute operation)"
"Mute-on (mute)"
"Mute-off (cancel mute)"
"Volume (volume operation)"
"Volume-up (turn up volume)"
"Volume-down (turn down volume)"
"Volume-specific (set volume to specific value)"

Note that each intention is identified by an intention tag. The intention tag is an identifier representing a simple intention and may be a number or a symbol. A descriptive text that explains the meaning of an intention by a natural language may be associated. Note that an intention connected by a hyphen "-" represents "superordinate concept-subordinate concept".

For example, in the intention "Power (power operation)", "Power" is an intention tag, and "power operation" is a descriptive text. When the above-described intention is designed, for example, if the user makes an utterance "I want to operate the power" to the dialogue system, "Power" is automatically assigned as the intention of the utterance by intention analysis processing.

Note that in the example of FIG. 2, as the descriptive text of the subordinate concept "up" of the superordinate concept "Volume", "turn up" is associated. Hence, the descriptive text of the intention tag "Volume-up" may be "volume operation-turn up". That is, a combination of descriptive texts (for example, "volume operation-turn up") corresponding to a combination of intention tags of the intention system as shown in FIG. 2 may be used. Alternatively, descriptive texts may be added to the intention tags in advance for all combinations (for example, "turn up volume").

The operation of the tagging support apparatus 100 according to the first embodiment will be described next with reference to the flowchart of FIG. 3.

In step S301, the spoken sentence acquirer 101 acquires one spoken sentence as the target of intention tag assignment processing.

In step S302, the intention candidate estimator 102 estimates one or more intention candidates of the spoken sentence. The intention candidates are estimated from intentions used in the dialogue system. As the intention candidates, for example, intentions obtained by existing intention analysis processing are acquired in the form of N-best. Alternatively, by character string matching between the spoken sentence and the descriptive texts of the intentions handled in the dialogue system, one or more intention candidates are selected from intentions corresponding to descriptive texts of high degrees of matching. Otherwise, using a statistical method, one or more intention candidates may be selected from the intentions in descending order of estimated score. The statistical method is a method of statistically estimating an intention concerning an unknown spoken sentence by defining pairs of a plurality of spoken sentences and the intentions of the spoken sentences prepared in advance as correct data.

In step S303, based on the one or more intention candidates, the intention system acquirer 104 acquires part of the intention system from the intention system DB 103 as hierarchical intention candidates while holding the structure of the intention system. By the process of step S303, the intentions that readily resemble or are readily confused in the small number of intention candidates can comprehensively be acquired as much as possible using the hierarchical structure of the intention system.

As the hierarchical intention candidates, for example, for at least one intention candidate, the intention of the superordinate concept of the intention corresponding to the intention candidate on the hierarchy in the intention system and the intentions of the subordinate concepts of the intention of the superordinate concept are acquired. Note that for each of the one or more intention candidates, all the intentions of the subordinate concepts of the intention of the superordinate concept may be acquired.

In step S304, the presenter 105 presents the spoken sentence and the one or more hierarchical intention candidates to the worker. For example, the one or more hierarchical intention candidates are displayed as options on a user interface screen configured to execute the intention tag assignment processing. An item such as "no intention found" or "N/A" to be selected by the worker if an intention assumed to represent the intention of the utterance does not exist among the presented hierarchical intention candidates may be added separately. The entire hierarchical structure of the hierarchical intention candidates may be presented. Alternatively, the hierarchical intention candidate (upper candidate) in the uppermost layer may be presented first. When the worker, for example, touches the upper candidate or clicks it with a mouse or the like, the lower layers may be expanded and presented in accordance with the instruction of the worker.

In step S305, the intention selector 106 obtains a hierarchical intention candidate selected according to an instruction from the worker as a selected intention.

In step S306, the work result DB 107 stores the spoken sentence and the selected intention in association with each other. The operation of the tagging support apparatus 100 according to the first embodiment thus ends.

A detailed example of the tagging support apparatus 100 according to the first embodiment will be described next with reference to FIGS. 2, 4, and 5.

Here, assume a case in which an intention cannot correctly be interpreted by the above-described dialogue system concerning a TV operation, for example, a case in which the user makes an utterance "reduce sound". The spoken sentence acquirer 101 acquires a spoken sentence "reduce sound".

Figures 3, 4:
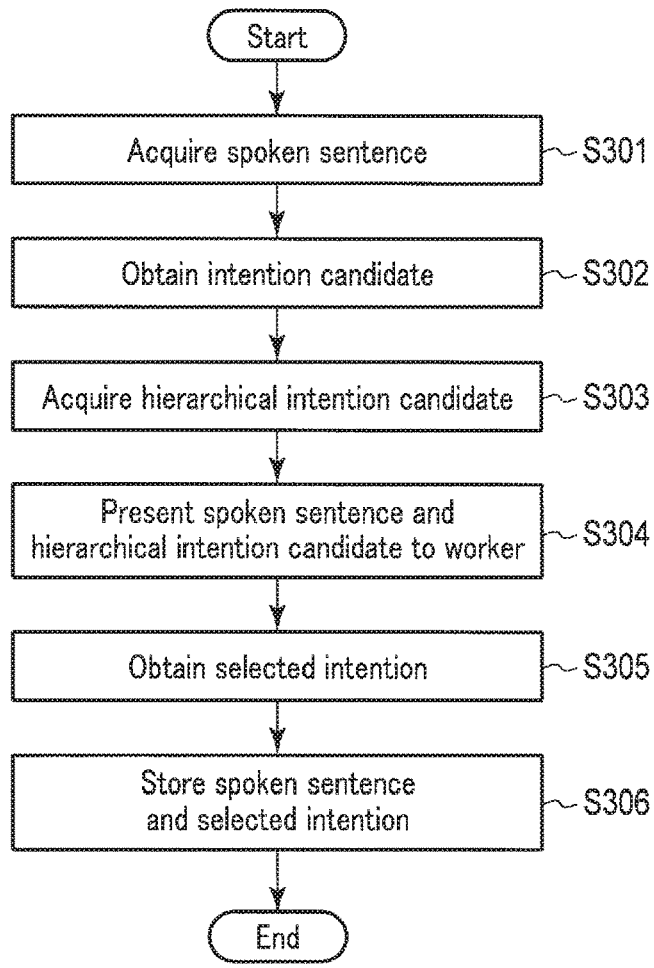
FIG. 3 is a flowchart showing the operation of the tagging support apparatus.
FIG. 4 is a view showing an example of one or more intention candidates obtained by the processing of an intention candidate estimator.

FIG. 4 shows an example of one or more intention candidates obtained from the spoken sentence "reduce sound" by the processing f the intention candidate estimator 102.

Here, the utterance intention of the spoken sentence "reduce sound" is estimated by existing intention analysis processing, thereby obtaining 4-best intention candidates 401. More specifically, assume that "mute", "turn up volume", "change volume to specific value", and "change acoustic mode" are obtained.

FIG. 5 shows an example of hierarchical intention candidates acquired by the intention system acquirer 104 from the intention candidates shown in FIG. 4.

FIG. 5 shows an example of hierarchical intention candidates 501 for which the intentions of the superordinate concepts in the intention system shown in FIG. 2 and the intentions of all subordinate concepts corresponding to the intentions of the superordinate concepts are acquired for the intention candidates 401 shown in FIG. 4.

More specifically, in the intention system shown in FIG. 2, for example, the intention "Mute-on (mute operation-mute)" corresponds to the intention candidate 401 "mute", and "Mute (mute operation)" that is the intention of the superordinate concept of "Mute-on (mute operation-mute)" is acquired. In addition, both of the intentions "on (mute)" and "off (cancel)" of the subordinate concepts of the intention "Mute (mute operation)" of the superordinate concept are acquired.

Hence, "Mute (mute operation)", "Mute-on (mute operation-mute)", and "Mute-off (mute operation-cancel)" can be obtained as the hierarchical intention candidates.

For the intention candidates 401 "turn up volume", "change volume to specific value", and "change acoustic mode" as well, the hierarchical intention candidates 501 shown in FIG. 5 can be obtained by the same processing as described above. Note that since the same superordinate concept is extracted for the intention candidate 401 "turn up volume" and the intention candidate 401 "change volume to specific value", the hierarchical intention candidate 501 obtained by processing one of the intention candidates 401 is held as the hierarchical intention candidate 501.

The worker can select an intention tag assumed to correctly represent the meaning of the spoken sentence by referring to the screen on which the hierarchical intention candidates 501 shown in FIG. 5 are presented and confirming the relationship of the superordinate concepts or the concept of parallelism of the intentions of the hierarchical intention candidates 501 as the options.

That is, when the worker selects "turn down" in the lower layer of volume operation for the spoken sentence "reduce sound", the intention selector 106 can obtain the selected intention "volume-down (turn down volume)".

According to the hierarchical intention candidates 501 shown in FIG. 5, the intention "volume-down (turn down volume)" that does not exist among the intention candidates shown in FIG. 4 can be presented to the worker, and an optimum intention tag can be assigned.

Data stored in the work result DB 107 will be described next with reference to FIG. 6.

A table 600 shown in FIG. 6 stores a spoken sentence 601 and an intention tag 602 in association with each other. In the above-described example, of the hierarchical intention candidates 501 as shown in FIG. 5, the hierarchical intention candidate 501 selected by the worker is stored as the selected intention (the intention tag in FIG. 6). The table 600 assigned by the selection of the worker is fed back to, for example, the database of intention analysis processing used by the intention candidate estimator 102, thereby raising the accuracy of intention candidate estimation.

According to the above-described first embodiment, the intention system acquirer expands the intentions that resemble or are readily confused using the hierarchical structure of the intention system handled by the dialogue system. Hence, even if the estimation of the intention candidates acquired by the intention candidate estimator is insufficient, it is possible to present more comprehensive selection candidates to the worker and support quick and correct tagging by the worker.

Second Embodiment

In the first embodiment, hierarchical intention candidates that hold the hierarchical structure of the intention system are presented. In the second embodiment, the hierarchical structure of hierarchical intention candidates is converted.

Figure 7:
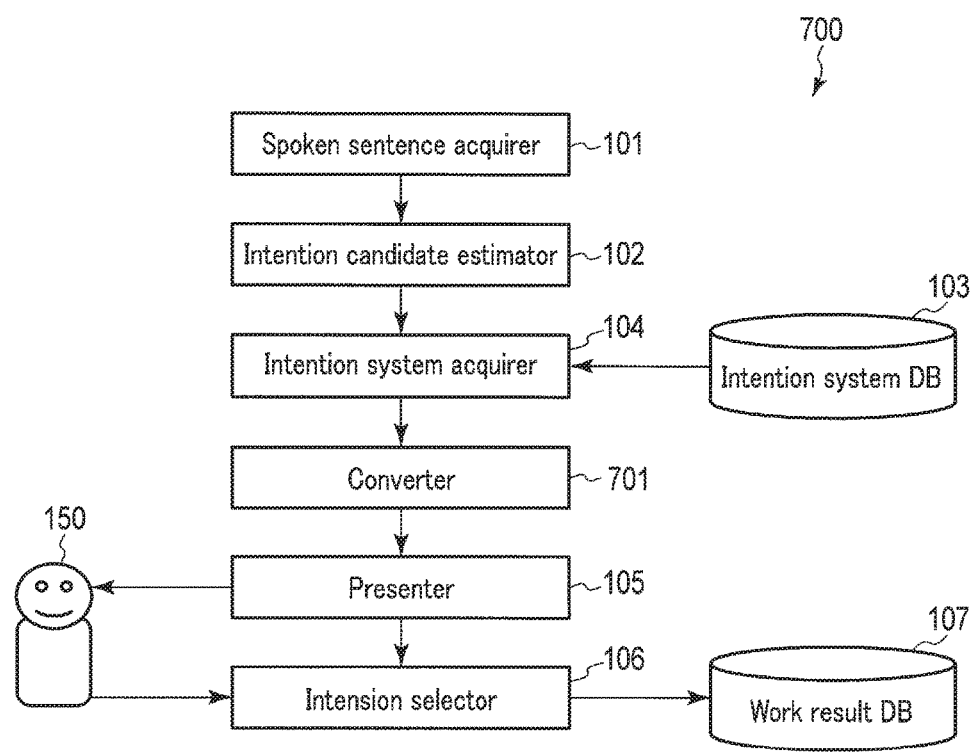
FIG. 7 is a block diagram showing a tagging support apparatus according to the second embodiment.

A tagging support apparatus according to the second embodiment will be described with reference to FIG. 7.

A tagging support apparatus 700 according to the second embodiment includes a spoken sentence acquirer 101, an intention candidate estimator 102, an intention system DB 103, an intention system acquirer 104, a presenter 105, an intention selector 106, a work result DB 107, and a converter 701.

Units other than the converter 701 are the same as in the first embodiment, and a description thereof will be omitted here.

The converter 701 receives hierarchical intention candidates from the intention system acquirer 104, and converts the hierarchical structure of the hierarchical intention candidates. As the conversion method, the hierarchical structure of the hierarchical intention candidate is converted such that an intention whose number of appearances as a subordinate concept in the hierarchical intention candidates is equal to or more than a threshold changes to a superordinate concept. Alternatively, the hierarchical structure of the hierarchical intention candidate is converted such that when the converter 701 divides the spoken sentence into one or more clauses, an intention representing the meaning of a clause whose certainty of representing the intention is equal to or more than a threshold changes to a superordinate concept. As the method of calculating the certainty, for example, the appearance probability of each clause in a spoken sentence corpus used to build the target dialogue system is used. Note that the intention representing the meaning of a clause is acquired using the same processing as the utterance intention estimation processing of the intention candidate estimator 102.

Note that the presenter 105 receives the hierarchical intention candidates after the conversion from the converter 701, and presents the hierarchical intention candidates after the conversion to a worker.

An example of a result obtained by converting the hierarchical structure of hierarchical intention candidates by the converter 701 will be described next with reference to FIG. 8.

FIG. 8(a) shows an example of hierarchical intention candidates obtained by the intention system acquirer 104 as a result of performing intention tag assignment processing for a spoken sentence "stop watching". As shown in FIG. 8(a), in the hierarchical intention candidates, an intention 801 "execute (do)" of a subordinate concept and an intention

802 "stop" of a subordinate concept appear many times. Hence, if a preset threshold is "5", the converter 701 converts the hierarchical structure such that each of the intention 801 "execute (do)" of the subordinate concept and the intention 802 "stop" of the subordinate concept changes to a superordinate concept because the numbers of appearances of the intention 801 "execute (do)" of the subordinate concept and the intention 802 "stop" of the subordinate concept in the hierarchical intention candidates are "7", that is, more than the threshold.

Figure 8:
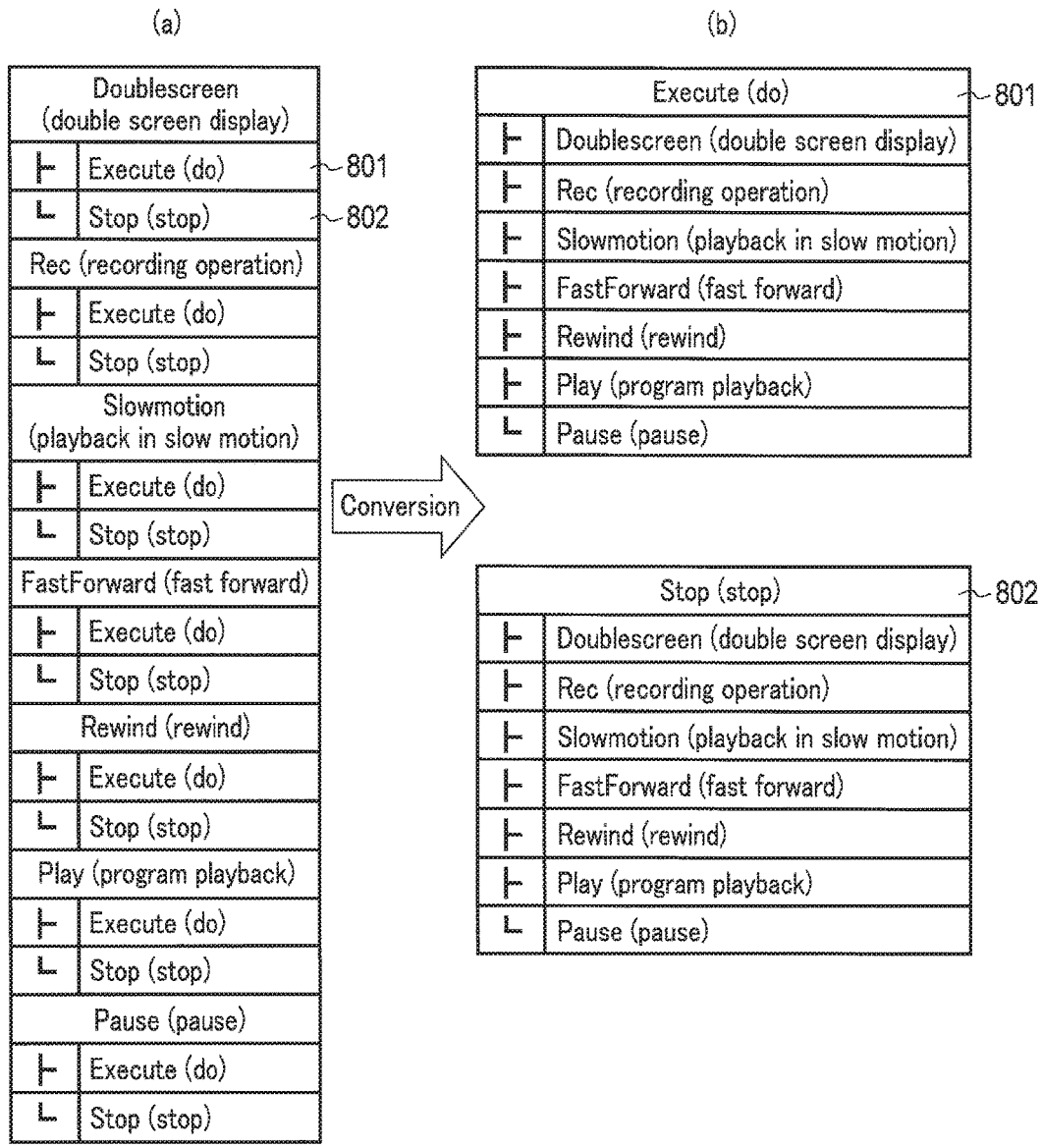
FIG. 8 is a view showing an example of a result obtained by converting the hierarchical structure of hierarchical intention candidates.

FIG. 8(*b*) shows the hierarchical structures of the hierarchical intention candidates after the conversion. As shown in FIG. 8(*b*), the intention 801 "execute (do)" and the intention 802 "stop" change to superordinate concepts, and "Double-screen (double screen display)", "Re (recording operation)", "Slowmotion (playback in slow motion)", "FastForward (fast forward)", "Rewind", "Play (program playback)", "Pause" as the intentions of superordinate concepts before the conversion change to new subordinate concepts.

Note that if the certainty of representing the intention "stop" by the clause "stop" of the spoken sentence "stop watching" is high, the converter 701 may delete hierarchical intention candidates associated with the intention 801 "execute (do)" and leave only hierarchical intention candidates associated with the intention 802 "stop". Since the options to be examined by the worker are thus narrowed down, the worker can more easily perform the intention tag assignment processing.

Note that the converter 701 may convert the hierarchical structure, of the intention system stored in the intention system DB 103 instead of converting the hierarchical structure of hierarchical intention candidates. As the conversion method, the same method as described above is used. The converter 701 holds the hierarchical structure of the intention system after the conversion, and the intention system acquirer 104 acquires hierarchical intention candidates from the intention system after the conversion. Even if the hierarchical structure of the intention system is converted before acquisition of hierarchical intention candidates, hierarchical intention candidates after the conversion as shown in FIG. 8(*b*) can be obtained.

According to the above-described second embodiment, by converting the hierarchical structure of the intention system, the intentions that resemble or are readily confused can be put in the same layer as the subordinate concepts. This allows the worker to clearly recognize the comparison targets in the intention candidates and grasp the difference between intention tags presented as assignment candidates more efficiently and quickly than before the conversion. It is therefore possible to support quick and correct tagging by the worker.

An instruction shown in the processing procedures of the above-described embodiments can be executed based on a program that is software. When a general-purpose computer system stores the program in advance and loads it, the same effects as those of the above-described tagging support apparatuses can be obtained. Each instruction described in the above embodiments is recorded in a magnetic disk (for example, flexible disk or hard disk), an optical disk (for example, CD-ROM, CD-R, CD-RW, DVD-ROM, DVD±R, DVD±RW, or Blu-ray® Disc), a semiconductor memory, or a similar recording medium as a program executable by a computer. Any storage format is employable as long as the recording medium is readable by a computer or an embedded system. When the computer loads the program from the recording medium, and causes the CPU to execute the instruction described in the program based on the program, the same operation as the tagging support apparatuses according to the above-described embodiments can be implemented. When the computer acquires or loads the program, it may be acquired or loaded via a network, as a matter of course.

An OS (Operating System) operating on the computer or MW (middleware) such as database management software or a network may execute part of each processing for implementing the embodiments based on the instruction of the program installed from the recording medium to the computer or embedded system.

The recording medium according to the embodiments is not limited to a medium independent of the computer or embedded system, and also includes a recording medium that stores or temporarily stores the program transmitted by a LAN or the Internet and downloaded.

The number of recording media is not limited to one. The recording medium according to the embodiments also incorporates a case in which the processing of the embodiments is executed from a plurality of media, and the media can have any arrangement.

Note that the computer or embedded system according to the embodiments is configured to execute each processing of the embodiments based on the program stored in the recording medium, and can be either a single device formed from a personal computer or microcomputer or a system including a plurality of devices connected via a network.

The computer according to the embodiments is not limited to a personal computer, and also includes a processing unit or microcomputer included in an information processing device. Computer is a general term for devices and apparatuses capable of implementing the functions of the embodiments by the program.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A tagging support apparatus comprising:
a first acquirer configured to acquire a spoken sentence concerning an utterance of a user;
an estimator configured to estimate an utterance intention of the spoken sentence to obtain one or more intention candidates of the utterance intention;
a first storage configured to store an intention system having a hierarchical structure of intentions used in a dialogue system;
a second acquirer configured to acquire, based on the intention candidates, part of the intention system as one or more hierarchical intention candidates;
a converter configured to convert a hierarchical structure of the hierarchical intention candidates such that an intention whose number of appearances as a subordinate concept is not less than a threshold changes to a superordinate concept; and
a presenter configured to present the hierarchical intention candidates whose hierarchical structure is converted.

2. The apparatus according to claim 1, further comprising a selector configured to select a hierarchical intention candidate as a selected intention from the hierarchical intention candidates in accordance with an instruction from one of the user and a worker.

3. The apparatus according to claim 2, further comprising a second storage configured to store the spoken sentence and the selected intention in association with each other.

4. The apparatus according to claim 1, wherein the second acquirer is configured to acquire at least one of (a) an intention corresponding to a superordinate concept of at least one of the intention candidates, and (b) an intention corresponding to a subordinate concept of at least one of the intention candidates.

5. The apparatus according to claim 1, wherein the second acquirer is configured to acquire the hierarchical intention candidates from the intention system whose hierarchical structure is converted.

6. The apparatus according to claim 1, wherein the converter is configured to convert the hierarchical structure such that an intention of a clause out of at least one clause of the spoken sentence, whose certainty of representing the intention is not less than the threshold, changes to a superordinate concept.

7. The apparatus according to claim 1, wherein the estimator is configured to perform character string matching between the spoken sentence and a descriptive text of an intention tag to obtain the intention candidates.

8. The apparatus according to claim 1, wherein the estimator is configured to obtain N-best of estimated intentions as the intention candidates.

9. The apparatus according to claim 1, wherein the second acquirer is configured to acquire one or more parts of the intention system as the hierarchical intention candidates while holding a structure of the intention system.

10. The apparatus according to claim 3, wherein the presenter is configured to present an uppermost layer of the hierarchical intention candidates, and to expand and present a lower layer of the hierarchical intention candidates in accordance with the instruction of the worker.

11. A tagging support method comprising:
acquiring a spoken sentence concerning an utterance of a user;
estimating an utterance intention of the spoken sentence to obtain one or more intention candidates of the utterance intention;
storing an intention system having a hierarchical structure of intentions used in a dialogue system;
acquiring, based on the intention candidates, part of the intention system as one or more hierarchical intention candidates;
converting a hierarchical structure of the hierarchical intention candidates such that an intention whose number of appearances as a subordinate concept is not less than a threshold changes to a superordinate concept; and
presenting the hierarchical intention candidates whose hierarchical structure is converted.

12. A non-transitory computer readable storage medium storing instructions of a computer program which when executed by a computer results in performance of steps comprising:
acquiring a spoken sentence concerning an utterance of a user;
estimating an utterance intention of the spoken sentence to obtain one or more intention candidates of the utterance intention;
storing an intention system having a hierarchical structure of intentions used in a dialogue system;
acquiring, based on the intention candidates, part of the intention system as one or more hierarchical intention candidates;
converting a hierarchical structure of the hierarchical intention candidates such that an intention whose number of appearances as a subordinate concept is not less than a threshold changes to a superordinate concept; and
presenting the hierarchical intention candidates whose hierarchical structure is converted.

* * * * *